(12) United States Patent
Oakman

(10) Patent No.: US 6,561,137 B2
(45) Date of Patent: May 13, 2003

(54) PORTABLE ELECTRONIC MULTI-SENSORY ANIMAL CONTAINMENT AND TRACKING DEVICE

(76) Inventor: Cheryl M Oakman, 11713 Paulton Rd., Pittsburg, IL (US) 62974

( * ) Notice: Subject to any disclaimer, the term of this patent is extended or adjusted under 35 U.S.C. 154(b) by 0 days.

(21) Appl. No.: 09/739,390

(22) Filed: Dec. 18, 2000

(65) Prior Publication Data

US 2002/0073933 A1 Jun. 20, 2002

(51) Int. Cl.$^7$ ............................................. A01K 15/04
(52) U.S. Cl. ....................................................... 119/721
(58) Field of Search ................................. 119/720, 721

(56) References Cited

U.S. PATENT DOCUMENTS

| | | | | | |
|---|---|---|---|---|---|
| 5,207,179 | A | * | 5/1993 | Arthur et al. ................ | 119/721 |
| 5,559,498 | A | * | 9/1996 | Westrick et al. ............. | 340/573 |
| 5,682,839 | A | * | 11/1997 | Grimsley et al. ............ | 119/721 |
| 5,915,980 | A | * | 6/1999 | Baldock ....................... | 439/120 |
| 6,019,066 | A | * | 2/2000 | Taylor .......................... | 119/720 |
| 6,058,889 | A | * | 5/2000 | Van Curen et al. .......... | 119/721 |
| 6,184,790 | B1 | * | 2/2001 | Gerig ....................... | 340/573.3 |
| 6,271,757 | B1 | * | 8/2001 | Touchton et al. ......... | 340/573.1 |

* cited by examiner

*Primary Examiner*—Charles T. Jordan
*Assistant Examiner*—Jordan M Lofdahl
(74) *Attorney, Agent, or Firm*—Michael I. Kroll

(57) ABSTRACT

The present invention 10 discloses a portable electronic, multi-sensory animal containment and tracking device which comprises a transmission cable 20 that is placed directly upon the ground to define a selective containment area 18 which cable 20 is plugged into and operated by a base unit 26 which can be powered by either rechargeable batteries 30 or a conventional 110-volt AC external power source 14. The transmission cable 20 has a plastic or rubberized coating 78 that is of a blue-violet and/or a yellow color to enhance the transmission cable's visibility to a canine 16. The transmission cable 20 emits a radio frequency output generated by a frequency generator 42 disposed in the base unit 26 and also activates an audible alarm through speaker 58 disposed in the remote unit 28 attached to the animal's collar 22 which thereby warns the animal 16 that it is close to the boundary line 20 and should retreat. If the animal 16 ignores the audible alarm and continues to proceed toward the perimeter of the confinement area 18, a mild electrical shock is introduced to the animal's neck via the conductive electrodes 68 which are disposed on the remote unit 28 attached to the collar 22. The present invention also provides an optional global positioning satellite system 82 capability wherein a global positioning satellite transmitter is located in the remote unit 28 worn on the collar 22 of the animal 16.

12 Claims, 11 Drawing Sheets

PORTABLE ELECTRONIC MULTI-SENSORY ANIMAL CONTAINMENT AND TRACKING DEVICE

BACKGROUND OF THE INVENTION

1. Field of the Invention

The present invention relates generally to electronic animal containment devices and, more specifically, to an electronic animal containment and tracking device that is portable and utilizes three successive methods of sensory stimulus to reinforce the boundaries within which an animal, particularly a canine, is to be contained. Many electronic animal containment devices are shown in the prior art but are either placed underground or hardwired to render them permanently installed and are dependant upon a single external power source making the disassembly, transport, and reassembly of the containment device impractical. People often visit or travel to places and want to bring their pets but are often hindered by the facilities such as a lack of a fenced in yard or that someone inside the house has allergies or incompatible pets. The present invention allows people to bring their pets to a myriad of places that they weren't able to previously. The present invention has a transmission cable that is placed directly on the ground to define the containment area and then plugged into a base unit which can be powered by the rechargeable batteries therein or by other available external power sources thereby providing an electronic portable animal containment device that is quickly and easily installed, broken down and transported making it ideal for people who desire to bring their pet with them when traveling, camping, visiting and the like. The canine is placed within the confines of the transmission cable which has a plastic or rubberized coating that is of a blue-violet and/or a yellow hue to enhance the transmissions cable's visibility to the canine. Canines have dichromatic vision meaning that their visual spectrum consists of blue-violet and yellow and they can differentiate among shades of gray therefore making the transmission cable lying on the ground easier for the canine to visually detect since it is of a color within their spectrum. Blue-violet is the preferred color since blue does not occur naturally within the environment. The transmission cable emits radio waves originating from a frequency generator inside the base unit and activates an audible alarm in the remote unit attached to the animals collar thereby warning the animal that it is too close to the boundary and should retreat. If the animal ignores the audible alarm and continues to proceed a mild electric shock is introduced to its neck via conductive electrodes emanating through the collar from the remote unit. The animal becomes conditioned after several shocks and then responds appropriately upon hearing the audible alarm and eventually associates the blue-violet or yellow cable with the alarm and the shock and will not attempt to breach the visual barrier. The present invention will allow a conditioned animal to visually adapt to the changing parameters that are inherent in a portable unit rather than having to continually redefine the boundaries through repeated stimuli.

Since having one's pet run away and get lost is one of the greatest fears of a person traveling or camping or such, the present invention provides an optional Global Positioning Satellite system wherein the GPS transmitter is located in the remote unit worn by the monitored animal. An animal locator handset with GPS receiver helps a person locate a wayward animal by pinpointing the animal's location relative to the animal locator handset and the base unit.

2. Description of the Prior Art

There are other shoulder harness attachments for vehicle safety belts. Typical of these is U.S. Pat. No. 4,136,338 issued to Ronald L. Antenore on Jan. 23, 1979.

Another patent was issued to Robert G. Yarnall Sr. et al. on Mar. 29, 1988 as U.S. Pat. No. 4,733,633. Yet another U.S. Pat. No. 4,967,695 was issued to James M. Giunta on Nov. 6, 1990 and still yet another was issued on Nov. 26, 1991 to Lee D. Weinstein as U.S. Pat. No. 5,067,441. U.S. Pat. No. 5,584,536 was issued to Edwin J. White on Dec. 17, 1996 and another patent was issued to Judy W. Gunby on Apr. 15, 1997 as U.S. Pat. No. 5,620,234.

U.S. Pat. No. 4,136,338

Inventor: Ronald L. Antenore

Issued: Jan. 23, 1979

A perimeter alarm apparatus includes a loop of wire to be placed around an area to be guarded and electrical circuitry connected with the loop for detecting the absence of a signal imposed on the loop. The signal imposed on the loop is produced by a sending unit worn by a child, for example, who is intended to remain within the area bounded by the loop. As long as the child is within the area, the sending unit will induce a signal on the loop, but when the child moves beyond the loop a predetermined distance, no signal is imposed on the loop, with the result that an alarm is sounded by the circuitry.

U.S. Pat. No. 4,733,633

Inventor: Robert G. Yarnall Sr. et al.

Issued: Mar. 29, 1988

An arrangement for controlling the movements of animals is disclosed. A pair of signal-broadcasting wire loops is used, arranged in a concentric fashion, to define the desired confinement area. As the animal approaches the inner wire loop, a receiver worn by the animal will pick up the broadcasted signal and give the animal a mild shock and/or emit an unpleasant noise. If the animal ignores these deterrents and continues to move out of the confinement area, its receiver will pick up the signal emitted by the outer wire, where this signal will trigger an alarm located at a base station (the owner's home), indicating to the owner that the animal has ignored the signals and is leaving the confinement area.

U.S. Pat. No. 4,967,695

Inventor: James M. Giunta

Issued: Nov. 6, 1990

A system for controlling the movement of an animal relative to an area is provided having a signal transmitter with a transmitting antenna associated with said area. A loop of wire serves as the transmitting antenna and defines the boundary of the area. An electronic receiver carried by the animal is responsive to a signal produced by the transmitting antenna for producing an animal control output, such as an annoying tone or an electrical shock, to the animal whenever the animal moves into the vicinity of the transmitting antenna. The electronic receiver has first and second orthogonal receiving antennas for receiving the signal produced by the wire loop antenna. Each antenna receives a respective component of the transmitted signal. Selection circuitry selects which of the respective components has greater magnitude and produces an actuating output to identify such component. Switch circuitry receives the respective components of the transmitted signal from each of the respective receiving antennas. The switch circuitry responds to the actuating output produced by the selection circuitry to output the respective component having greater magnitude. Control circuitry is responsive to the selected component output from the switch circuit for producing the control output to the animal to control the movement of the animal relative to the selected area. As such, the control circuitry continuously responds to the receiving antenna having the best reception to produce the animal control output.

U.S. Pat. No. 5,067,441

Inventor: Lee D. Weinstein

Issued: Nov. 26, 1991

An animal restraining system includes a radio frequency transmitter adapted to be located adjacent an area in which the animal is to be restrained, a transmitting antenna, and a collar unit worn by the animal. The collar unit has a multiplicity of radio signal receivers each having a highly directional receiving antenna with the receiving antennae of the multiplicity of receivers having their axes of maximum sensitivity oriented in different directions, and an analyzer for determining a composite of the field strengths of the radio signals received by the receiving antennae, and detecting when the composite field strength at the receiving antennae falls below predetermined values. When the detected composite field strength falls below a first predetermined value, a first warning signal is generated to the animal, and a second and different warning signal is generated when the composite field strength falls below a second predetermined value.

U.S. Pat. No. 5,605,116

Inventor: J. S. Kim et al.

Issued: Feb. 25, 1997

An electro-shock training system including remote voice command capability. The training unit includes a hand-held transmitter which remotely controls a receiver unit attached to a collar worn by the animal to be trained. Positive feedback and voice commands are communicated to the animal via a speaker associated with the receiver unit. Negative reinforcement is provided in the form of a mild electrical shock via electrodes associated with the receiver unit.

U.S. Pat. No. 5,794,569

Inventor: John Titus et al.

Issued: Aug. 18, 1998

The present invention discloses a method and apparatus for electronically confining an animal within one or more selected spaces within a selected area. Current pulses are directed around conducting perimeters surrounding the selected spaces. The animal to be confined is provided with a collar unit, which includes a sensor adapted to sense whether the animal approaches a conducting perimeter from inside the selected space or outside the selected space, and a correction unit adapted to provide correction to the animal in response to a sensor output. The portable unit reports to a central controller which selects a correction strategy, such as level of correction to be applied to the animal approaching the perimeter. The controller provides warnings to the user, including warnings for when the animal passes out of bounds, when the battery in the collar unit goes low and when the animal stays in a correction zone for too long. An additional feature of the invention includes the ability to connect a computer to the system for remote control and monitoring, and for maintaining a log of animal behavior.

U.S. Pat. No. 5,967,094

Inventor: Richard L. Grimsley et al.

Issued: Oct. 19, 1999

A system (10) for confining an animal (18) in an area (16) defined by a boundary signal. The system includes a transmitter (22; 22A) to generate the boundary signal and an emitter such as a wire (20) to define area (16). The system also includes a receiver (26; 26A; 200; 200A) to be carried on the animal's neck. The receiver includes three selectively monitored and orthogonally-positional antennas (30, 32, 34; 202, 204, 206) to avoid missing a boundary signal. The receiver further includes code-detecting, duration monitoring and/or signal-strength circuitry (270) to control giving a shock to the animal. Further, the receiver is duty-cycled to conserve battery power (56). The shock is communicated via a conductive compliant tip (532) to reduce discomfort to the animal. The transmitter includes circuitry (64) to include a code in the boundary signal, and an isolation transformer (102) to protect the transmitter from energy strikes, such as lightning, at the emitter (20).

U.S. Pat. No. 6,095,092

Inventor: Wayne W. Chou

Issued: Aug. 1, 2000

An animal control device, and method for confining an animal within a boundary identified by a current carrying conductor. The animal is equipped with a control device, as an antenna coil, which is coupled to a magnetic flux emanating from the conductor. When the animal approaches the boundary conductor, the change in voltage across the antenna coil is compared with a reference change in voltage. As the distance closes from a charging animal, the rate of change in voltage from the antenna coil increases correspondingly, providing a reliable detection of the animal's imminent crossing of the boundary. Conventional animal correction circuitry is provided which, in response to a detected voltage change, issues a corrective stimulus to the animal to stop the animal from crossing the boundary.

While these electronic animal containment devices may be suitable for the purposes for which they were designed, they would not be as suitable for the purposes of the present invention, as hereinafter described.

SUMMARY OF THE PRESENT INVENTION

The present invention discloses a portable electronic, multi-sensory animal containment and tracking device which comprises a transmission cable that is placed directly upon the ground to define a selective containment area which cable is plugged into and operated by a base unit which can be powered by either rechargeable batteries or a conventional 110-volt AC external power source. The transmission cable has a plastic or rubberized coating that is of a blue-violet and/or a yellow color to enhance the transmission cable's visibility to a canine. The transmission cable emits a radio frequency output generated by a frequency generator disposed in the base unit and also activates an audible alarm through a speaker disposed in the remote unit attached to the animal's collar which thereby warns the animal that it is close to the boundary line and should retreat. If the animal ignores the audible alarm and continues to proceed toward the perimeter of the confinement area, a mild electrical shock is introduced to the animal's neck via the conductive electrodes which are disposed on the remote unit attached to the collar. The present invention also provides an optional global positioning satellite system capability wherein a global positioning satellite transmitter is located in the remote unit worn on the collar of the animal.

A primary object of the present invention is to provide a base unit having a frequency generator that transmits a specific frequency through a thin, flexible, plastic or rubber coated transmission cable. The selected frequency acts upon a battery powered remote unit worn on an animal's collar when said remote unit is proximal to the transmission cable thereby activating an audible alarm and electrical shock mechanism to encourage the animal to retreat from the retaining perimeter.

Another object of the present invention is to provide a portable electronic multi-sensory animal containment device wherein the transmission cable has a male distal end and a female distal end with each distal end plugged into the base unit to provide a complete circuit with the frequency generator located therein.

Still another object of the present invention is to provide a portable electronic multi-sensory animal containment device wherein the transmission cable can be extended to cover a greater area by adding a second segment of transmission cable in series with the first by removing the male end of the first cable from the base unit and connecting it to the female end of the second cable and inserting the male end thereof into the base unit.

A further object of the present invention is to provide a portable electronic multi-sensory animal containment device wherein the base unit contains a rechargeable battery therein for remote use and a 110 VAC cord for standard use when applicable. A jack is also provided to accept a 12 VDC adapter for supplying power from a vehicle's cigarette lighter.

A yet further object of the present invention is to provide a portable electronic multi-sensory animal containment device having a battery operated remote unit that is retained on the animals neck by a collar adapted to insure that conductive electrodes on the remote unit make contact with the animal in order to apply a mild electrical shock to the animal as the remote unit is brought into the proximal vicinity of the transmission cable defining the perimeter of the retaining area and receives the frequency being emitted therefrom.

Another object of the present invention is to provide a portable electronic multi-sensory animal containment device having a remote unit further including an audible alarm that is enabled prior to the application of the mild electric shock thereby reinforcing the desired conditioning and allowing the animal to avoid future stimuli by retreating at the onset of the audible alarm.

Yet another object of the present invention is to provide a portable multi-sensory electronic animal containment device having a means for adjusting the sensitivity of the shock applied to the animal.

Still another object of the present invention is to provide a portable electronic multi-sensory animal containment device having a GPS transceiver having transmitters located in the remote unit and in the base unit and a receiver and a transmitter within an animal locator handset with a grid screen to show the location of the missing animal relative to the handset and the base unit.

Still yet another object of the present invention is to provide a portable electronic animal containment device wherein the plastic or rubber coating of the transmission cable is yellow or blue-violet to increase visibility to the animal and allow it to define the boundaries without the need of subsequent stimuli.

Still another object of the present invention is to provide a portable electronic animal containment device that is simple and easy to use.

One other object of the present invention is to provide a portable electronic animal containment device that is economical in cost to manufacture.

Additional objects of the present invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE PREFERRED EMBODIMENTS

In order that the invention may be more fully understood, it will now be described, by way of example, with reference to the accompanying drawings in which FIGS. 1 through 11 illustrate the present invention being a portable electronic multi-sensory animal containment and tracking device.

Figure 1:
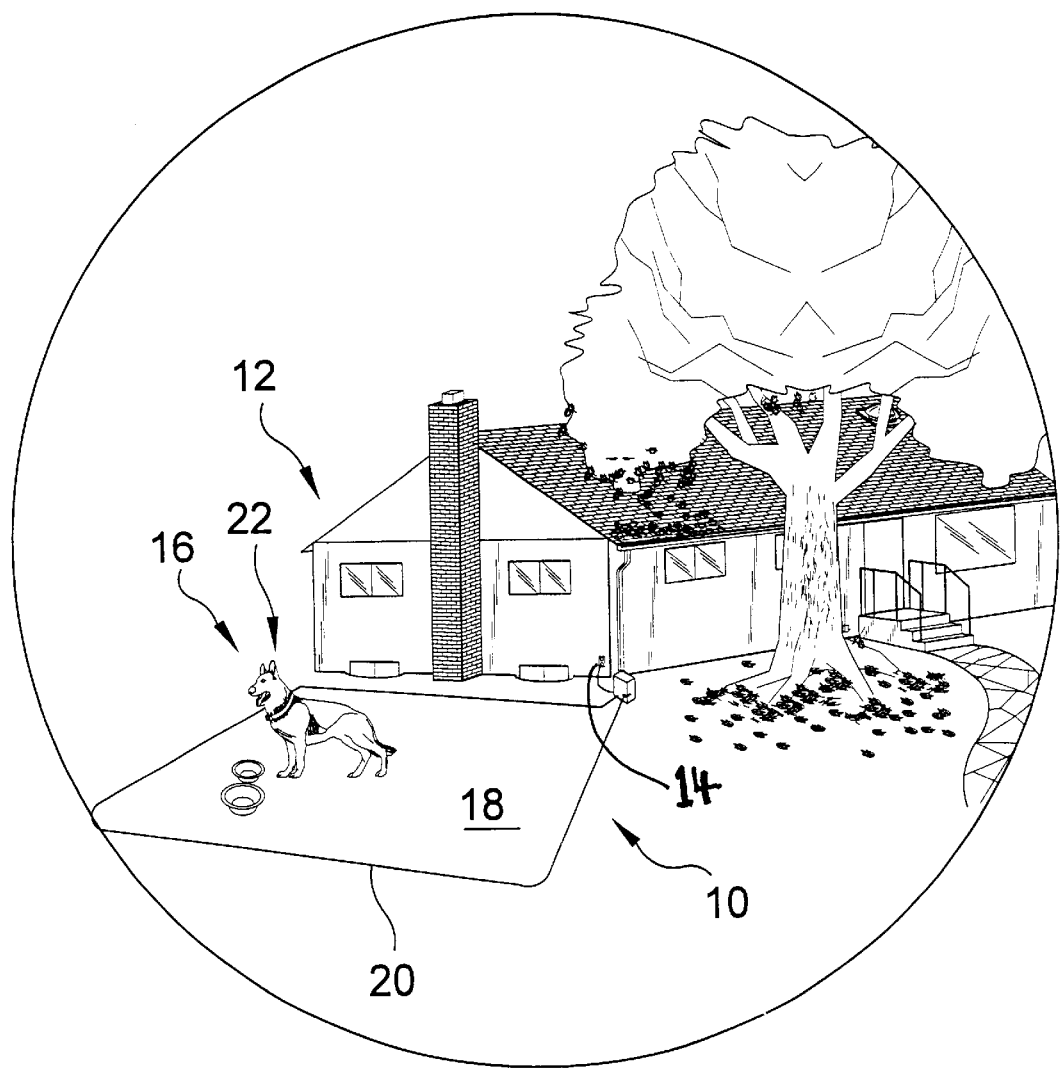
FIG. 1 is perspective view of the present invention in use at a house using a 110 VAC outlet. The present invention could be set up at a user's house in minutes and can later be just as easily disconnected and wrapped up for use at another place such as when visiting friends or family who don't have a fenced in yard but bringing a pet would be desired.

Turning to FIG. 1, shown therein is perspective view of the present invention 10 in use at a house 12 using a conventional 110 VAC outlet 14. The present invention 10 could be set up at a user's house 12 in minutes and can later be just as easily disconnected and wrapped up for use at another place such as when visiting friends or family who don't have a fenced in yard but bringing a pet 16 such as a canine would be desired. The present invention 10 discloses a method and apparatus for electronically confining an animal 16 within a selective space and confinement area 18. The radio frequency output is directed through the transmission cable 20 placed peripherally about area 18 to define the selected space or area 18. The confined animal 16 is provided with a collar unit 22 that includes a receiver (not shown) that can detect the animal 16 approaching the conductive perimeter 20 from the inside of the selected space or area 18.

Figure 2:
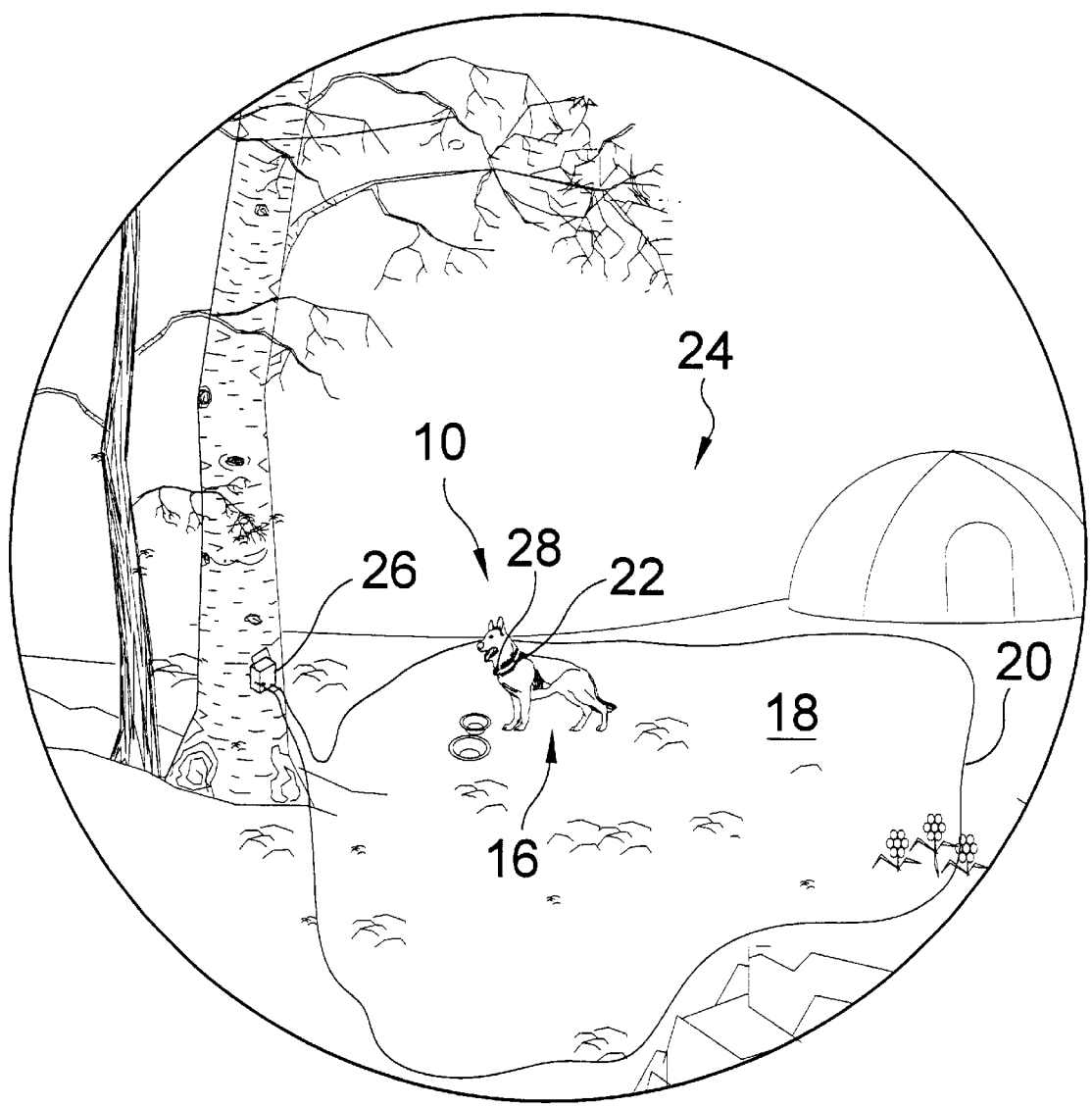
FIG. 2 is a detailed front view of the present invention use at a campsite using self contained batteries as the power source for the base unit to transmit a particular frequency though a coated transmission cable. A remote unit on the monitored animal's collar will respond to that frequency when in the immediate proximity of the transmission cable by enabling an audible alarm prior to relaying a mild electrical shock that will help condition the animal to avoid the defined perimeter of the containment area.

Turning to FIG. 2, shown therein is a detailed front view of the present invention 10 in use at a campsite 24 using self contained batteries as the power source for the base unit 26 to transmit a particular frequency though a coated transmission cable 20. A remote unit 28 on the monitored animal's collar 22 will respond to that frequency when in the immediate proximity of the transmission cable 20 by enabling an audible alarm prior to relaying a mild electrical shock that will help condition the animal 16 to avoid the defined perimeter 20 of the containment area 18. The audible alarm will also serve to inform the pet owner that the animal 16 is about to breech the confinement perimeter 20.

Figure 3:
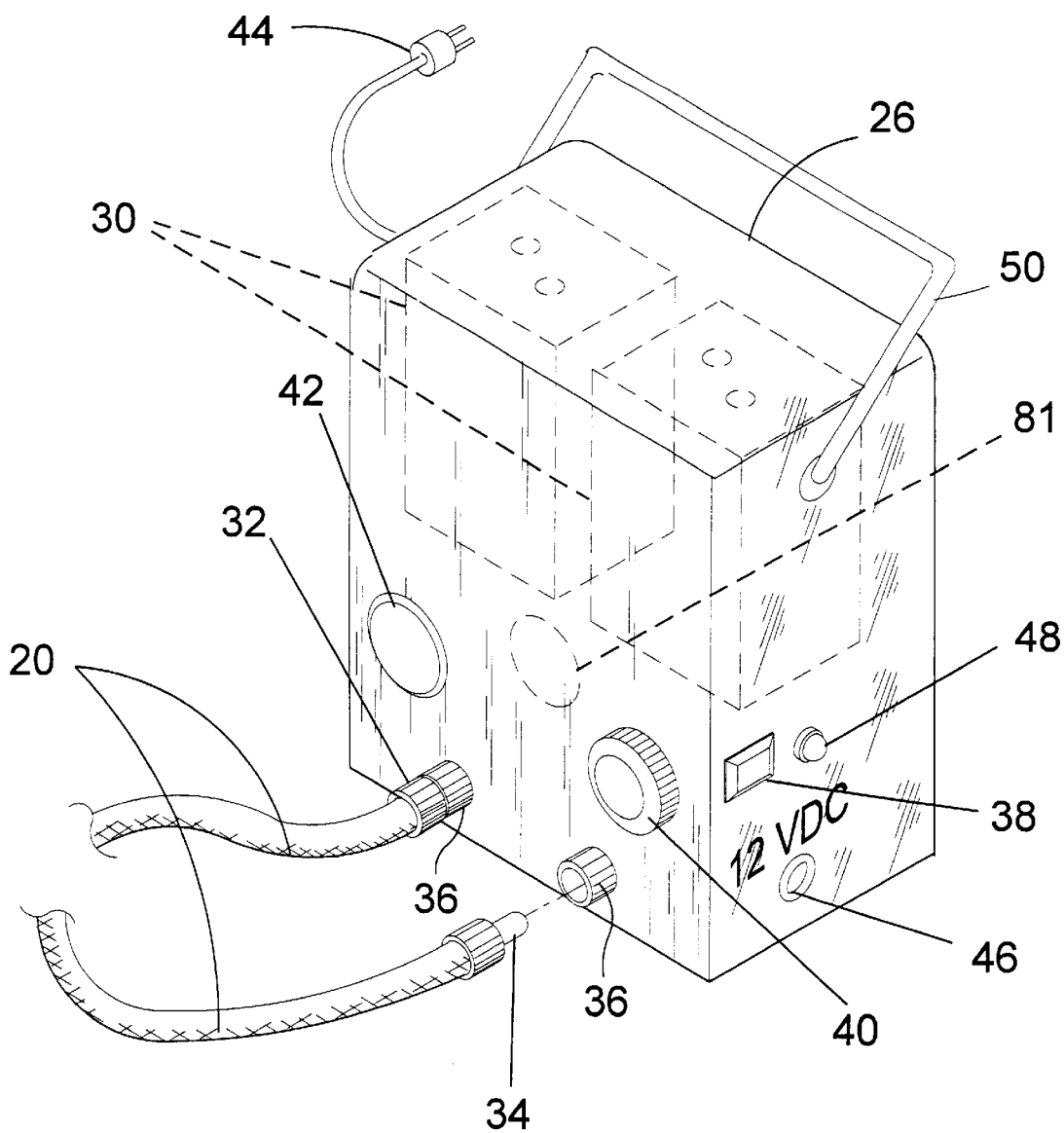
FIG. 3 is a perspective view of the base unit of the present invention showing the rechargeable batteries in hidden line. The female end of the transmission cable is installed in a jack in the base unit and the male end is ready to be inserted into its respective jack, turn on the power switch, adjust the shock intensity and the present invention is fully installed and operating.

Turning to FIG. 3, shown therein is a perspective view of the base unit 26 of the present invention showing the rechargeable batteries 30 in hidden line. The female end 32 of the transmission cable 20 is installed in a mating jack 36 in the base unit 26 and the male end 34 is ready to be inserted into its respective mating jack 36, thereafter the on/off power switch 38 turned on, the shock intensity control knob 40 adjusted, and the present invention is then ready for operation. Also shown are a frequency generator 42 which generates radio frequency waves for transmission through the transmission cable 20, along with a 110-volt AC power cord 44 and a 12-volt DC outlet 46 and a power indicator light 48. Also shown on base unit 26 is a carrying handle or hanger 50 along with a global positioning satellite transmitter 81.

Figure 4:
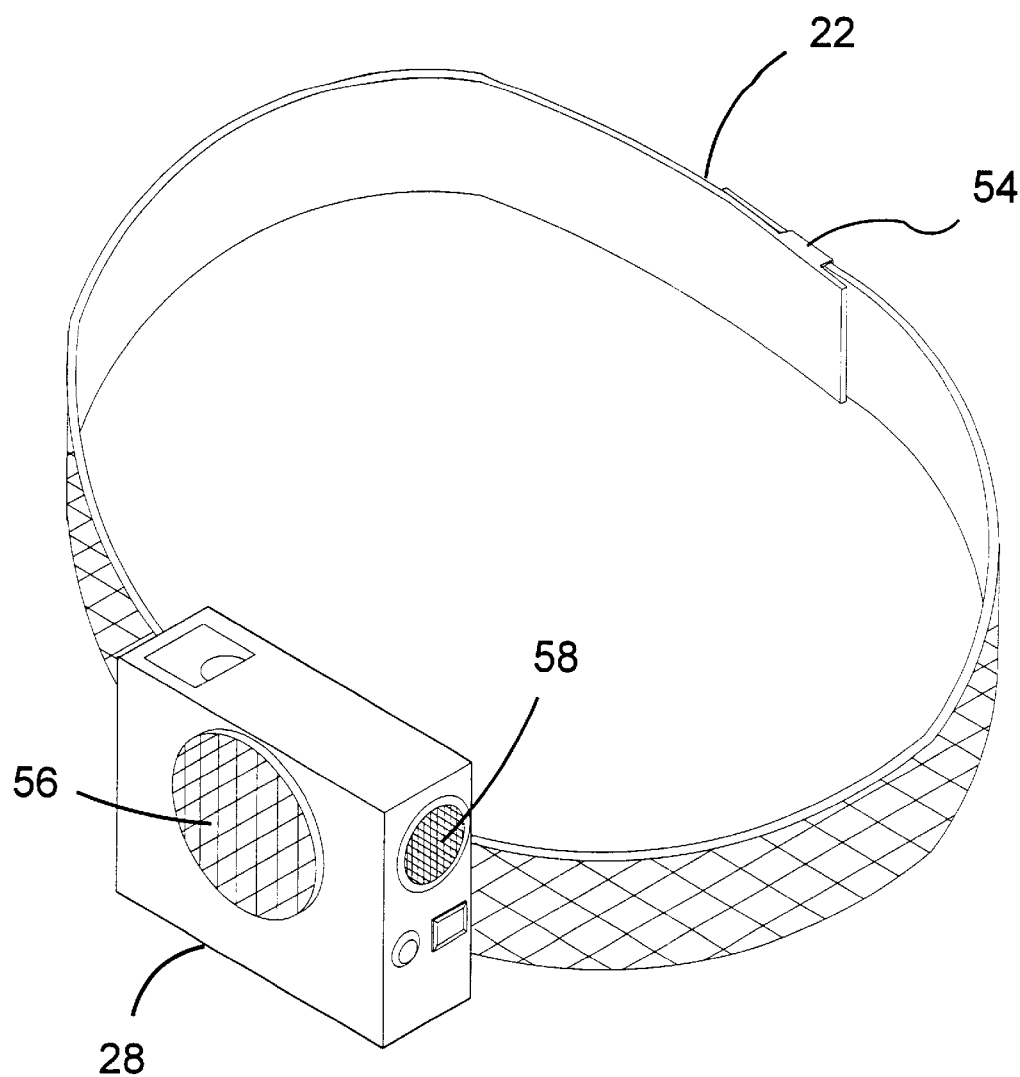
FIG. 4 is a perspective view of the collar and remote unit.

Turning to FIG. 4, shown therein is a perspective view of the collar 22 and remote unit 28. Shown is the remote unit 28 disposed by fastening means onto the collar 22 which has a collar attachment means 54 of the conventional type as would be done by one skilled in the art. Also shown is the receiver 56 and speaker 58 which are located on the remote unit 28.

Figure 5:
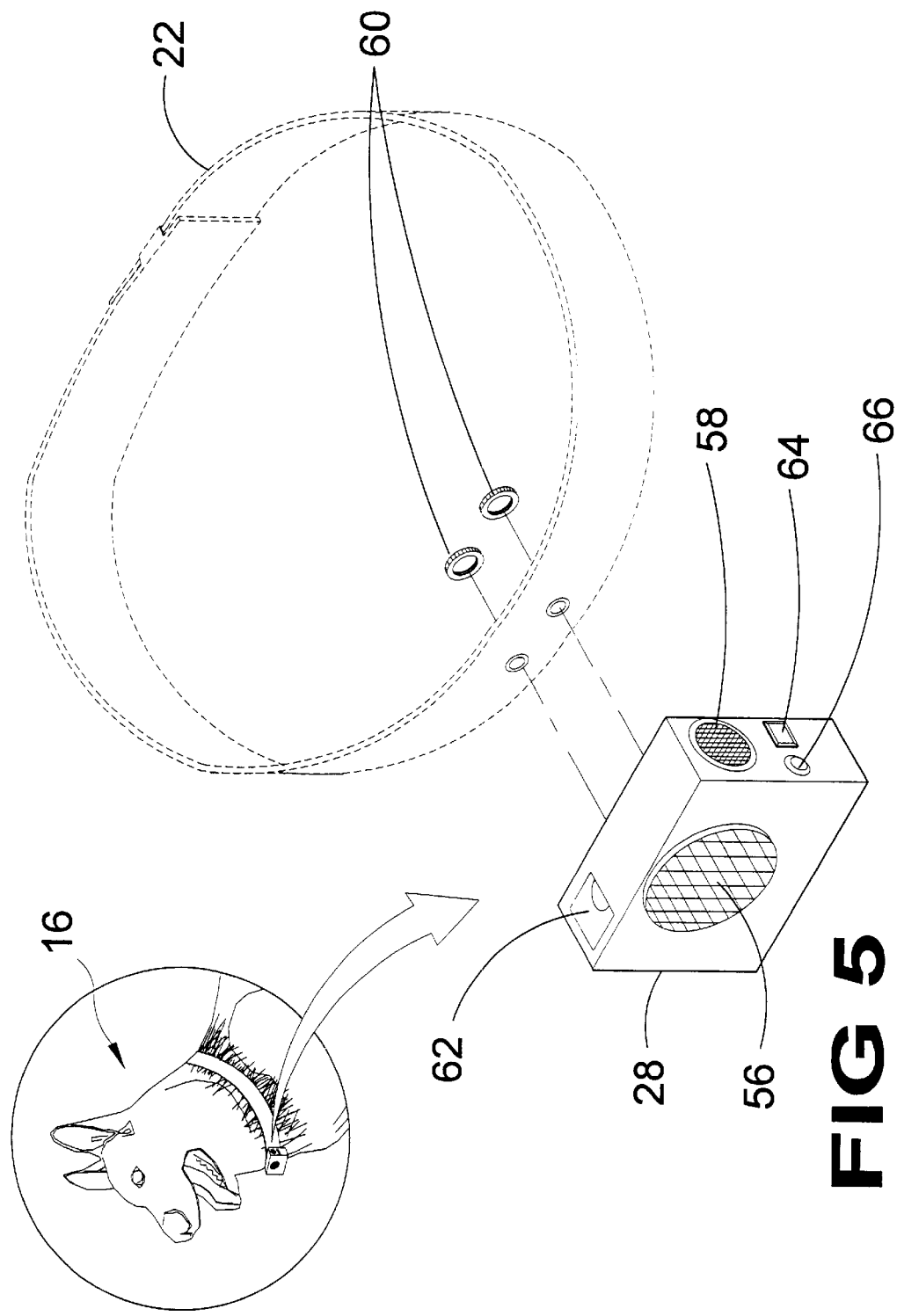
FIG. 5 is an exploded perspective view of the collar and the remote unit showing the means for attaching the remote unit to the collar. The remote unit has a battery as an independent power source and houses a receiver to activate the audible alarm and the conductive electrodes that apply the electrical charge to the animal. The remote unit housing also contains control buttons and a power indicator light.

Turning to FIG. 5, shown therein is an exploded perspective view of the collar 22 and the remote unit 28 showing the means for attaching 60 the remote unit 28 to the collar 22. The remote unit 28 has a battery internal the battery compartment 62 as an independent power source and houses a receiver 56 to activate the audible alarm 58 and the conductive electrodes (not shown) that apply the electrical charge to the animal 16. The remote unit housing also contains on/off control buttons or switch 64 and a power indicator light 66.

Figure 6:
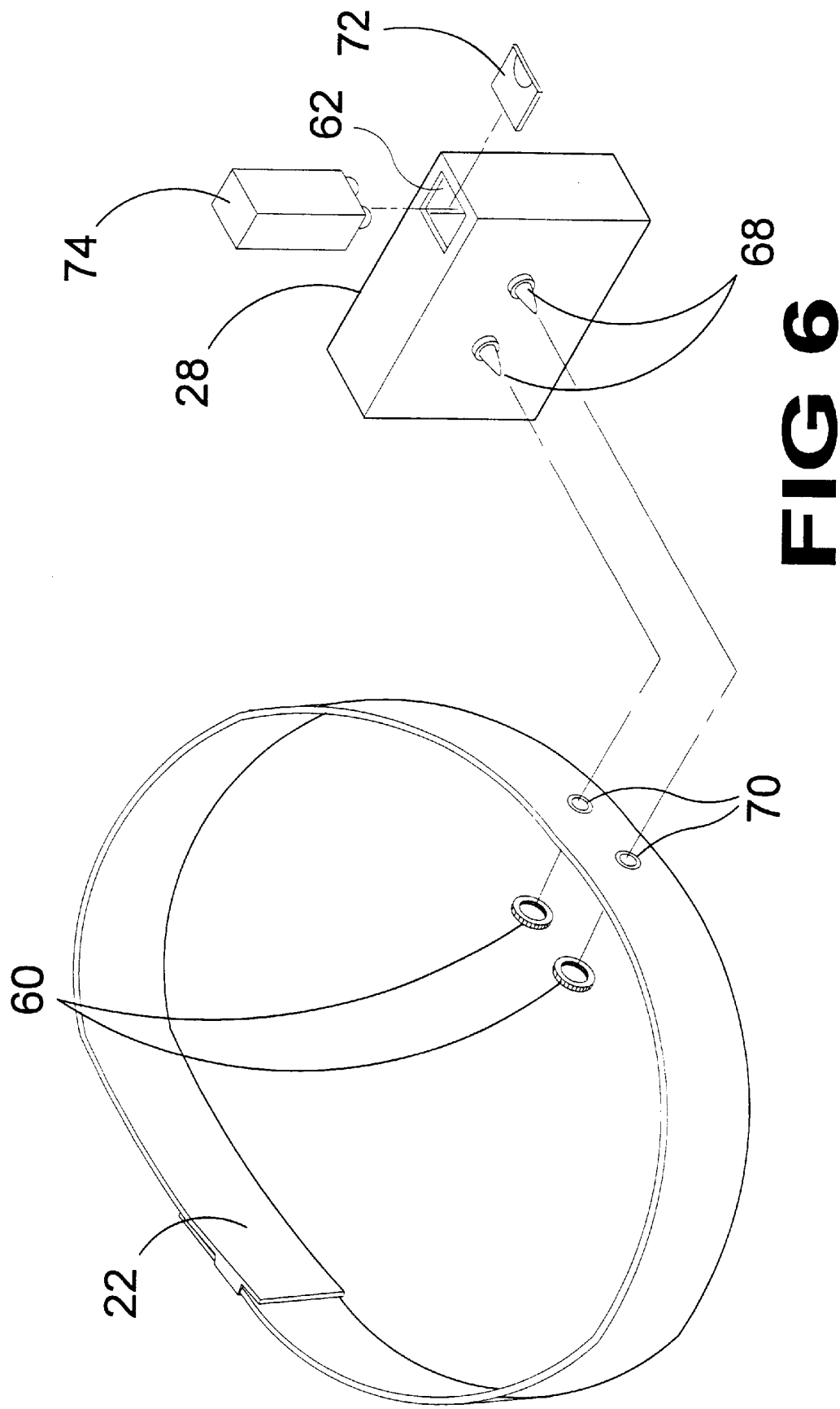
FIG. 6 is an exploded perspective view of the collar and the remote unit showing the means for attaching the remote unit to the collar. The remote unit is shown from the rear to demonstrate the electrodes which protrude through the collar to apply electrical current to an animal when attempting to breach the boundary.

Turning to FIG. 6, shown therein is an exploded perspective view of the collar 22 and the remote unit 28 showing the means for attaching 60 the remote unit 28 to the collar 22. The remote unit 28 is shown from the rear to demonstrate the conductive electrodes 68 which protrude through the collar apertures 70 to apply electrical current to an animal when it is attempting to breach the boundary. Also shown is the battery compartment 62 with cover 72 and battery 74.

Figure 7:
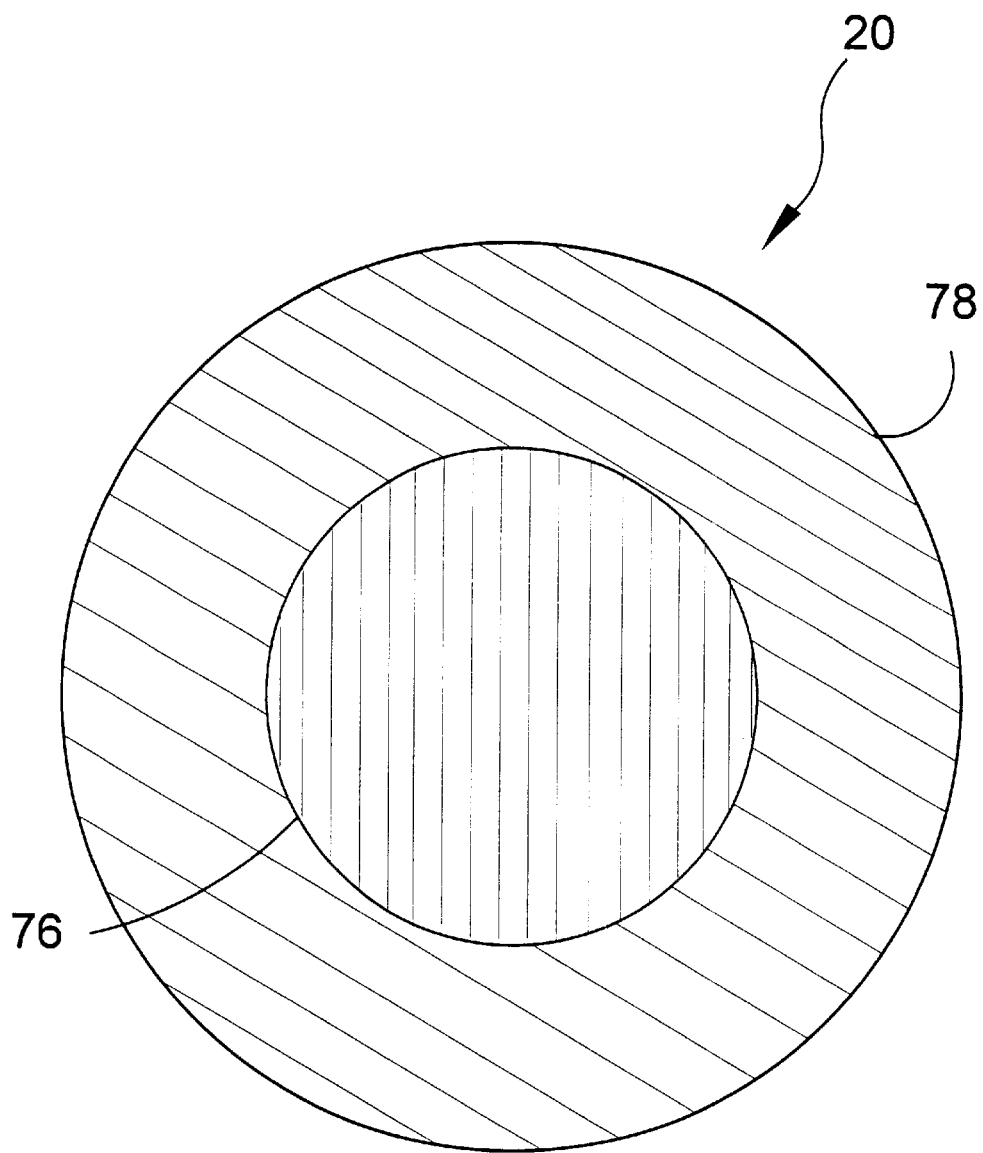
FIG. 7 is a cross-sectional view of the transmitting cable showing the central conductive wire and the blue-violet sheathing.

Turning to FIG. 7, shown therein is a cross-sectional view of the transmitting cable 20 showing the central conductive wire 76 and the blue-violet coating or sheathing 78. The canine (not shown) is placed within the confines of the transmission cable 20 which has a plastic or rubberized coating 78 that is of a blue-violet and/or yellow color to enhance the transmission cable's visibility to the animal 16. Canines have dichromatic vision, meaning that their visual spectrum consists of blue-violet and yellow and they can differentiate among shades of gray therefore making the transmission cable lying on the ground easier for the canine to visually detect since it is of a color within this spectrum. Blue-violet is the preferred color since blue does not occur naturally within the environment. The present invention will allow a conditioned animal to visually adapt to the changing perimeters that are inherent in a portable unit rather than having to continually redefine the boundaries through repeated stimuli.

Figure 8:
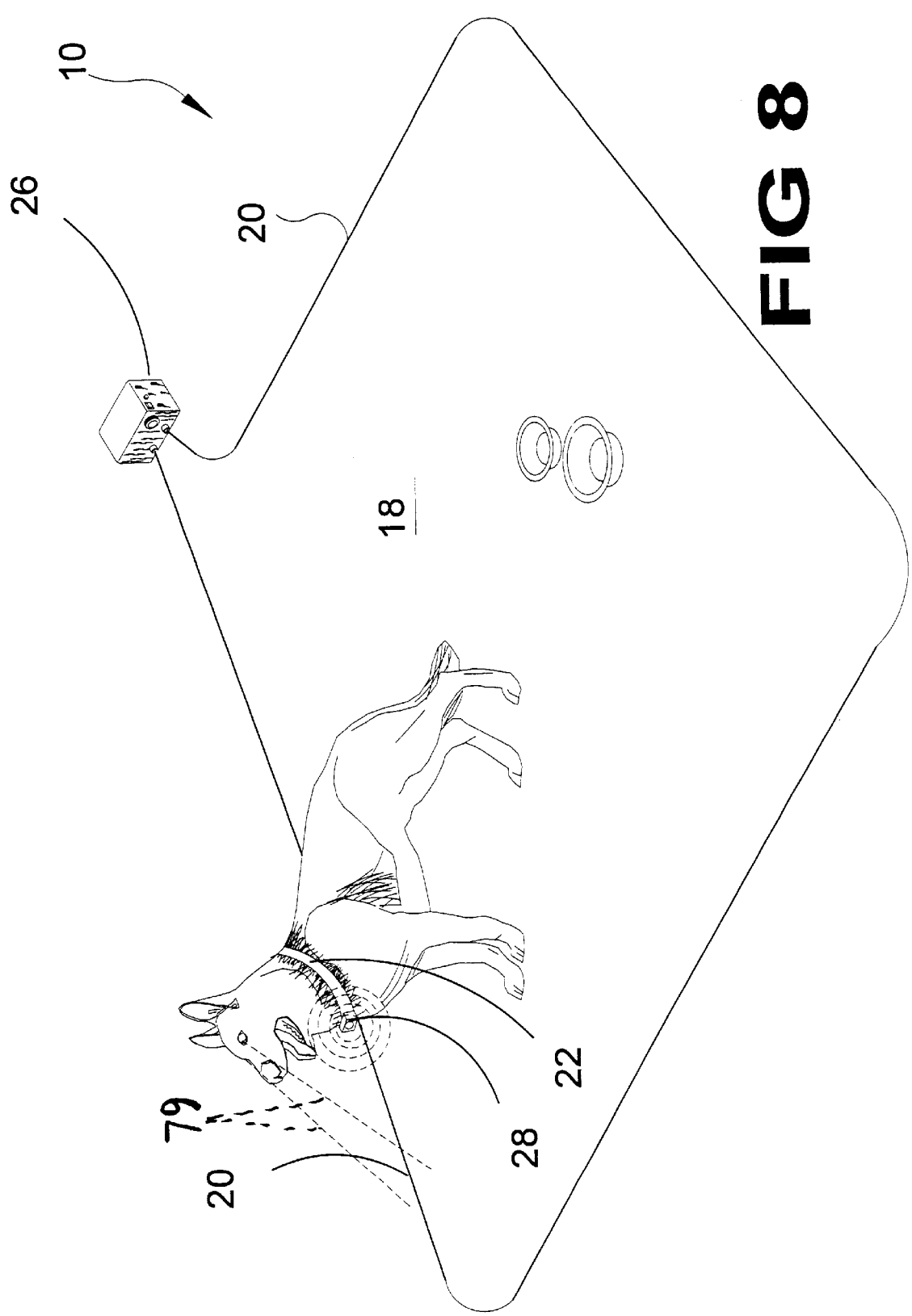
FIG. 8 is a perspective view of the present invention in use illustrating the color recognition properties of the transmission cable to the canine who recognizes the mild shock it receives in response for attempting to breach the perimeter of the containment area.

Turning to FIG. 8, shown therein is a perspective view of the present invention 10 in use illustrating the color recognition properties of the transmission cable 20 to the canine 16 using eye sight lines 79 which recognizes the mild shock it receives in response for attempting to breach the perimeter 20 of the containment area. Also shown is the collar 22, remote unit 28 and base unit 26.

Figure 9:
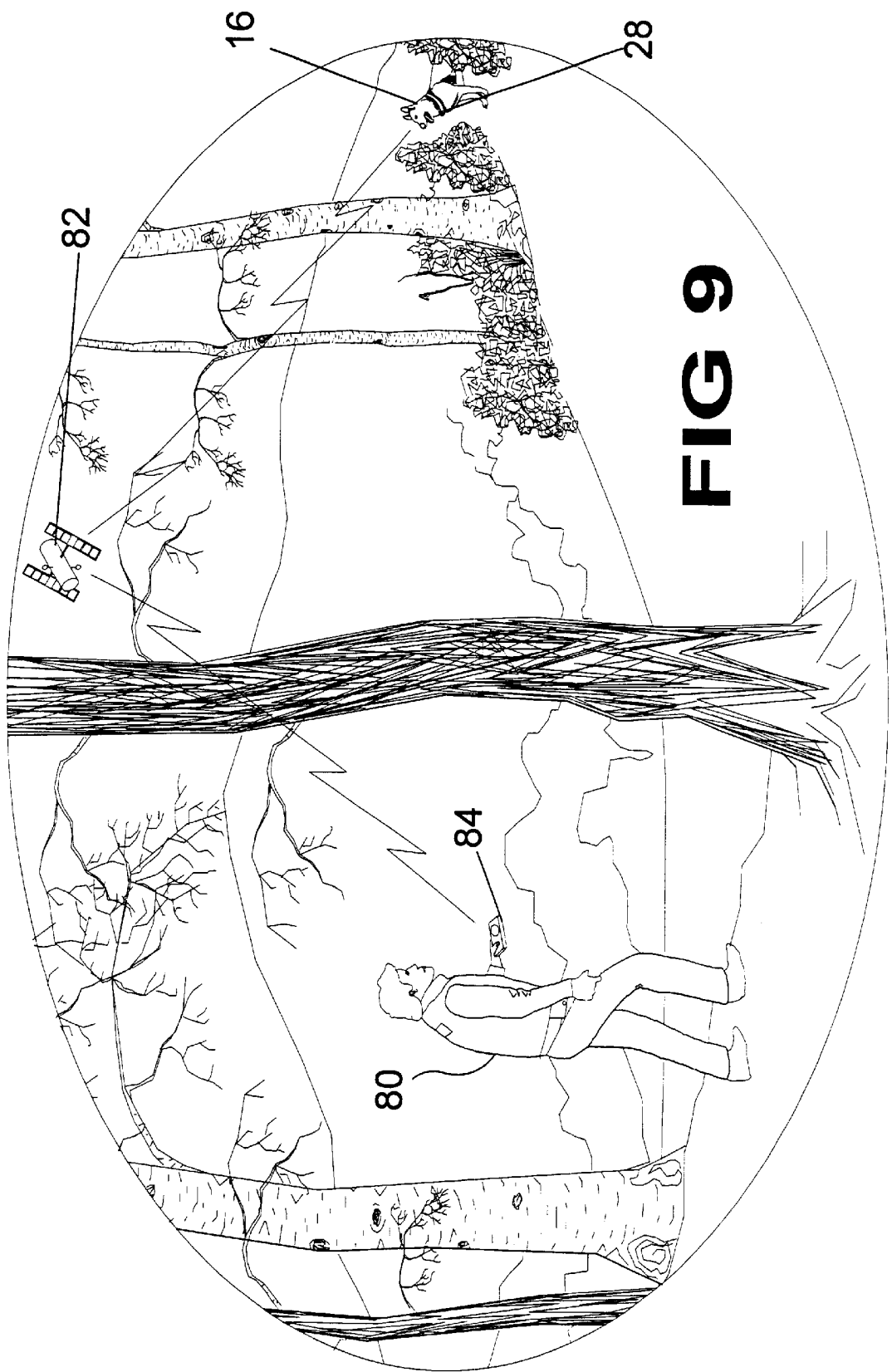
FIG. 9 is a perspective view of the operator using the global positioning satellite system of the present invention to track down and locate his runaway dog.

Turning to FIG. 9, shown therein is a perspective view of the operator 80 using the global positioning satellite system 82 of the present invention to track down and locate his runaway dog 16. The operator 80 has a GPS handset 84 which communicates through the satellite system 82 with the remote unit 28 on the dog 16.

Figure 10:
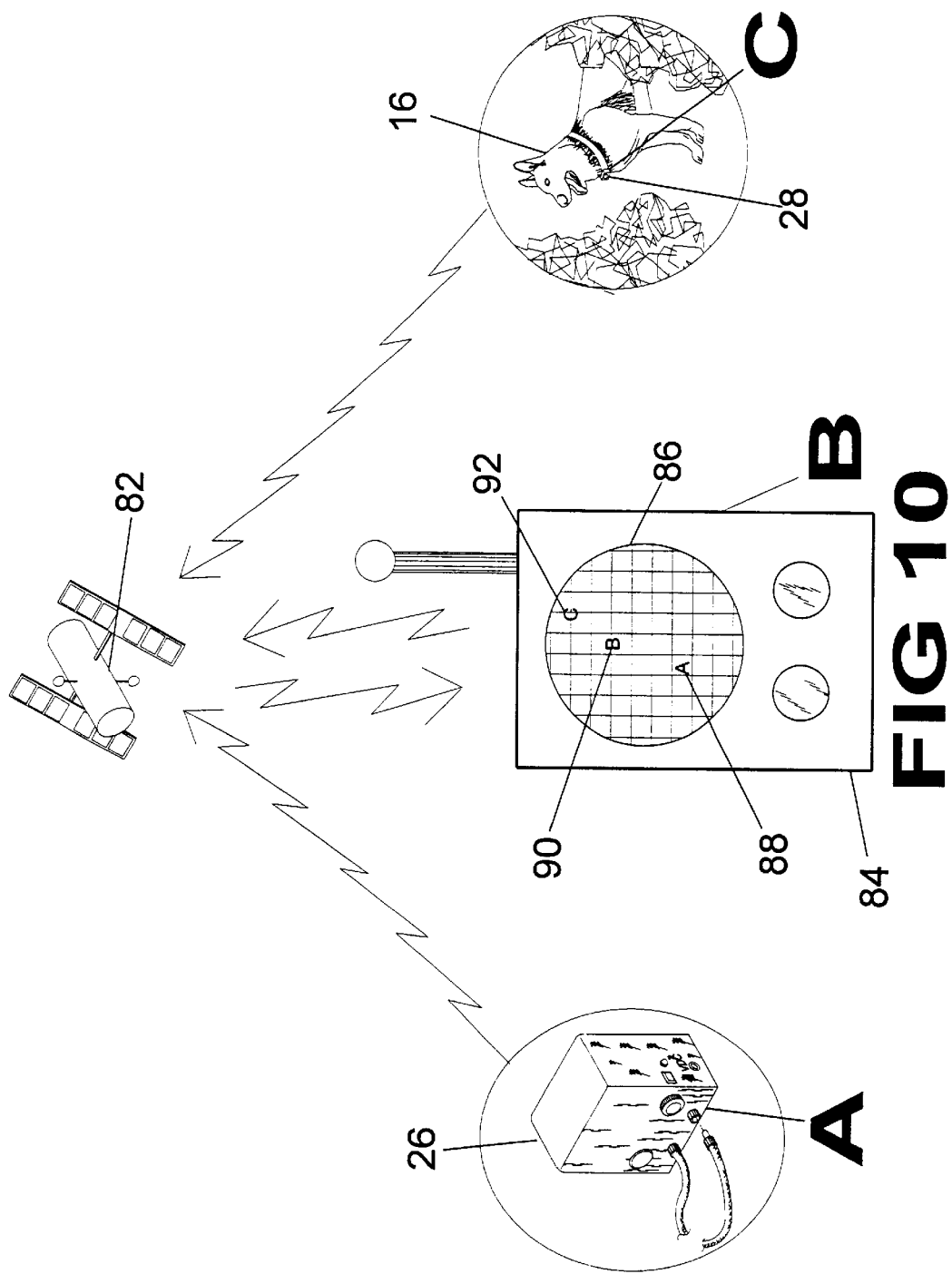
FIG. 10 is a diagrammatic view showing the relationship and interaction of the various transmission and receiving components of the global positioning satellite system being used to locate a lost animal. The GPS uses a transmitter in the remote unit and a transmitter and receiver in the handset to relay the location of the animal relative to the handset. A transmitter in the base unit provides a third stationary signal to add a stable point of reference and to assist in returning to camp after finding and leashing the dog.

Turning to FIG. 10, shown therein is a diagrammatic view showing the relationship and interaction of the various transmission and receiving components of the global positioning satellite system 82 being used to locate a lost animal 16. The GPS uses a transmitter in the remote unit 28 and a transmitter and receiver in the handset 84 to relay the location of the animal 16 relative to the handset 18. A transmitter in the base unit 26 provides a third stationary signal to add a stable point of reference and to assist in returning to camp after finding and leashing the dog 16. The locator grid 86 shows thereon the position of the base unit 26 using the letter A as 88, the position of the locator handset B at 90 and the position of the remote unit C at 92 thereby enabling the operator to define the spatial relationships of the various units 26, 28, 84.

Figure 11:
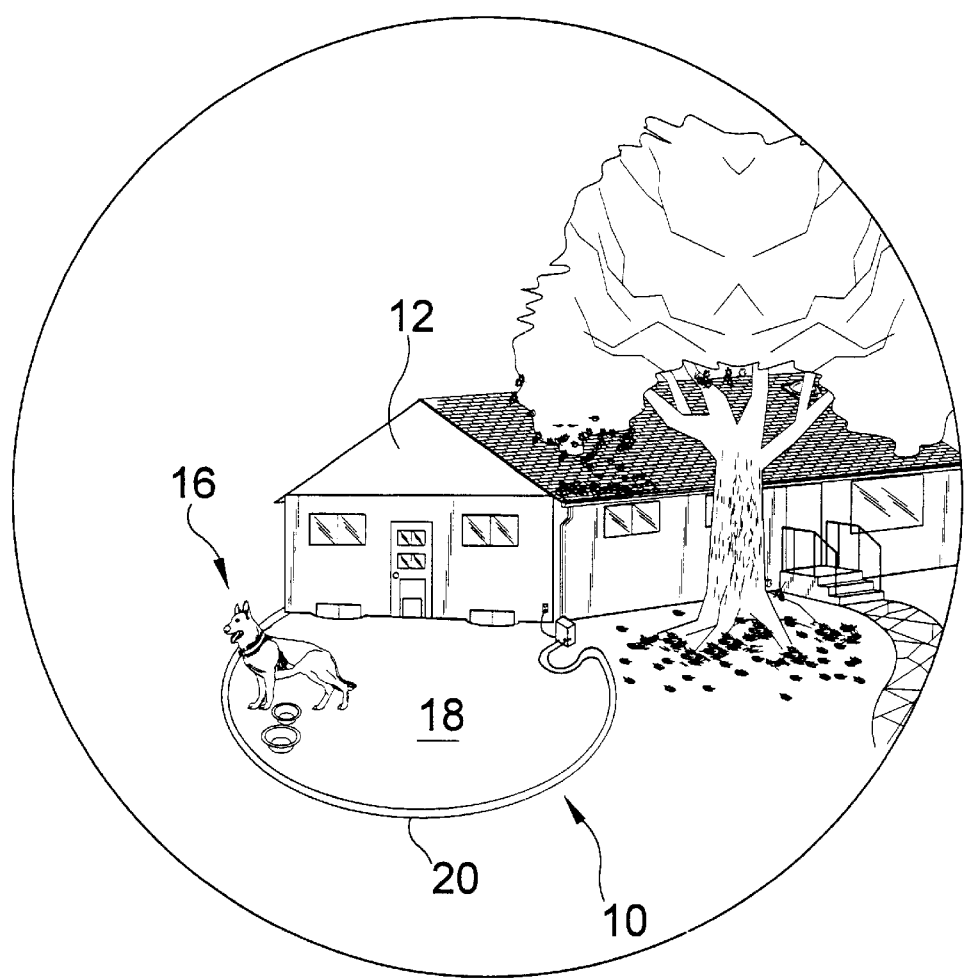
FIG. 11 is perspective view of the present invention in use at a house using a 110 VAC outlet. The present invention could be set up at a user's house in minutes and can later be just as easily disconnected and wrapped up for use at another place such as when visiting friends or family who don't have a fenced in yard but bringing a pet would be desired. Also shown is the parameter enclosure in a circle shape as it flanks the door and outer walls of the intended house.

Turning to FIG. 11, shown therein is the perspective view of the present invention 10 in use at a house 12 using a 110 VAC outlet 14. The present invention 10 could be set up at a user's house in minutes and can later be just as easily disconnected and wrapped up for use at another place such as when visiting friends or family who don't have a fenced in yard but bringing a pet 16 would be desired. Also shown is the perimeter enclosure area 18 defined by cable 20 in a circle shape as it flanks the door and outer walls of the intended house 12.

What is claimed to be new and desired to be protected by Letters Patent is set forth in the appended claims.

I claim:

1. An apparatus for confining an animal within a defined area, comprising:
    a) means for generating a radio frequency output housed in a first portable enclosure;
    b) a radio frequency transmission cable arranged about the periphery of the defined area at ground level to permit moving said cable to a different defined area, said cable having a first end and a second end, said first portable enclosure having first and second connectors for receiving the first and second ends of said transmission cable, respectively;
    c) means for receiving a radio frequency output disposed on the neck of the animal, further comprising a collar disposed on the neck of the animal upon which said means for receiving is disposed;
    d) means for providing an audible output for alerting an owner of said animal disposed on said means for receiving a radio frequency output;
    e) means for shocking the animal disposed on said means for receiving a radio frequency output;
    f) said transmission cable being enclosed by a sheathing whose color is within the visible color spectrum of said animal; and
    g) said animal being a dog and said sheathing of said transmission cable is colored blue-violet so that said dog can see said sheathing and associate said sheathing with limits of movement.

2. The apparatus of claim 1, said means for generating a radio frequency output further comprises a battery power supply.

3. The apparatus of claim 1, said means for generating a radio frequency output further comprises a conventional 110 volt alternating current power supply.

4. The apparatus of claim 2, wherein said means for receiving a radio frequency output further comprises a second enclosure for housing said means for receiving a radio frequency output.

5. The apparatus of claim 4, wherein said second enclosure is disposed on said collar.

6. The apparatus of claim 5, wherein said means for producing an audible output is disposed on said second enclosure.

7. The apparatus of claim 6, wherein said means for producing an audible output further comprises an audio speaker.

8. The apparatus of claim 7, wherein said means for shocking the animal is disposed on said second enclosure.

9. The apparatus of claim 8, wherein said means for shocking the animal further comprises conductive electrodes, said electrodes disposed contiguous to the skin of the animal.

10. The apparatus of claim 9, wherein said first enclosure further comprises a global positioning satellite transmitter for cooperating with a global positioning satellite system.

11. The apparatus of claim 10, wherein said second enclosure further comprises a global positioning satellite transmitter for cooperating with a global positioning satellite system.

12. The apparatus of claim 11, further comprising a global positioning satellite portable handset whereby the location of said first enclosure and said second enclosure can be determined and displayed.

* * * * *